United States Patent Office 3,178,431
Patented Apr. 13, 1965

3,178,431
2-HYDRAZINO-4,6-DIAMINO-1,3,5-TRIAZINES
Alexander Staehelin, Reinach, Basel-Land, and Albrecht Hueni, Basel, Switzerland, assignors to Ciba Corporation, New York, N.Y., a corporation of Delaware
No Drawing. Filed Apr. 28, 1964, Ser. No. 363,301
Claims priority, application Switzerland, Aug. 4, 1960, 8,838/60; Oct. 11, 1960, 11,394/60; June 19, 1961, 7,178/61
10 Claims. (Cl. 260—249.6)

The present invention relates to compounds of the formula

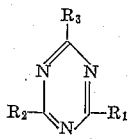

and of their salts, in which formula $R_1$ and $R_2$ each represents an amino group which is disubstituted by lower hydrocarbon radicals of aliphatic character whose carbon chains may be interrupted by hetero atoms such as oxygen, nitrogen or sulfur, and $R_3$ represents a hydrazino group which is substituted by at least one substituted or unsubstituted hydrocarbon radical of aliphatic character whose carbon chains may be interrupted by hetero atoms such as oxygen, nitrogen or sulfur, and to processes for preparing same.

Lower hydrocarbon radicals of aliphatic character are above all saturated or mono-unsaturated radicals containing at most 8 carbon atoms, being alkyl, cycloalkyl, or cycloalkyl-alkyl radicals. Radicals of the aforementioned type, interrupted by hetero atoms, are above all oxaalkyl, oxaalkylene, aza-cycloalkyl, aza-alkylene or oxacycloalkylalkyl radicals; in particular there may be mentioned the following groups: methyl, ethyl, allyl, propyl, isopropyl; linear or branched radicals bound in any desired position, being butyl, pentyl, hexyl or heptyl groups, 3-oxabutyl, 3-oxapentyl, 3-oxaheptyl, butylene-(1,4), butylene-(1,5), hexylene-(1,5), hexylene-(1,6), hexylene-(2,5), heptylene-(1,7), heptylene-(2,7), heptylene-(2,6), 3-oxa- or aza-pentylene-(1,5), 3-methyl-3-aza-pentylene-(1,5), 3-oxa- or azahexylene-(1,6), cyclopentyl, cyclohexyl, cyclopentenyl or cyclohexenyl radicals; cyclopentyl-, cyclohexyl-, cyclopentenyl-, cyclohexenyl-methyl or -ethyl radicals, or 2-oxa-cyclopentylmethyl or 4-aza-cyclohexyl radicals.

In the case of $R_3$, there may be mentioned as substituents in these radicals above all: for alkyl radicals—free hydroxyl groups or especially aryl or heterocyclic radicals, such as phenyl, pyridyl, furyl, or thienyl radicals, the aryl or heterocyclic radicals being unsubstituted or substituted by lower alkyl radicals, such as methyl, ethyl, propyl or butyl radicals, or by lower alkoxy radicals, such as methoxy, ethoxy or methylenedioxy radicals, halogen atoms, such as chlorine, bromine, or trifluoromethyl, nitro or amino groups; for cycloalkyl, oxa or azacycloalkyl radicals, the substituents may be lower alkyl radicals, such as methyl. In the aralkyl or heterocyclyl-alkyl radicals the alkylene radical is above all a methylene or ethylene radical.

A preferred embodiment of the invention are compounds of the formula

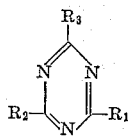

in which formula $R_1$ and $R_2$ each represents an amino group which is disubstituted by members selected from the group consisting of alkyl, alkenyl, monooxaalkyl, monoazaalkyl, cycloalkyl, cycloalkenyl, cycloalkyl-alkyl, cycloalkenyl-alkyl, mono-azacycloalkyl, mono-azacycloalkyl-alkyl, mono-oxacycloalkyl, monooxacycloalkyl-alkyl, alkylene, monooxaalkylene, monoazaalkylene and N-alkyl-mono-azaalkylene containing at most 8 carbon atoms each and $R_3$ represents hydrazino bearing at least one substituent selected from the group consisting of hydroxy-lower alkyl, cyclo-lower alkyl, monoazacyclo-lower alkyl, N-lower alkyl-monoazacyclo-lower alkyl, pyridyl-lower alkyl, furyl-lower alkyl, thienyl-lower alkyl and alkylpyridyl-lower alkyl and therapeutically useful acid addition salts thereof.

Especially noteworthy are compounds of the formulae I and II

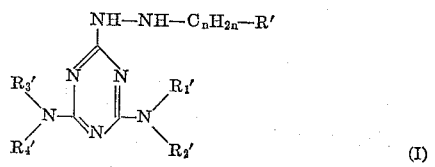

(I)

and

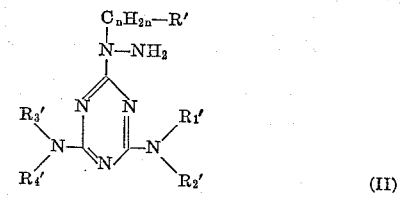

(II)

and their salts in which formula $n=1$ or 2, R' represents a pyridyl, furyl or thienyl radical, and $R_1'$ to $R_4'$ represent lower alkyl radicals such as methyl, propyl, isopropyl, isobutyl or secondary butyl, especially ethyl, or $R_1'$ and $R_2'$ together and/or $R_3'$ and $R_4'$ together may also represent an alkylene, oxaalkylene or azaalkylene radical such as butylene-(1,4), pentylene-(1,5), 3-oxapentylene-(1,5), 3-azapentylene-(1,5), hexylene-(1,6), 3-azahexylene-(1,6) or 3-methyl-3-azapentylene-(1,5).

Furthermore, the invention relates in particular to compounds of the Formulae III and IV

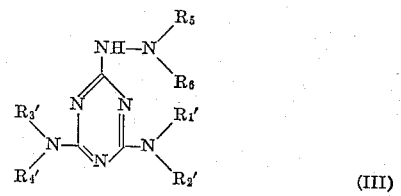

(III)

and

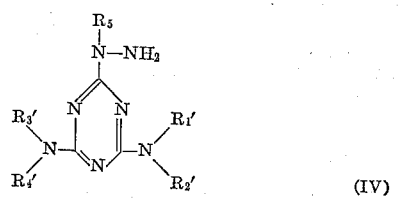

(IV)

and their salts, in which formulae $R_1'$ to $R_4$ each represents a lower alkyl radical, such as methyl, propyl, isopropyl, butyl, isobutyl or secondary butyl, or especially ethyl; or in which $R_1'$ and $R_2'$ together and/or $R_3'$ and $R_4'$ together represent an alkylene, oxa-alkylene or aza-alkylene radical, such as butylene-(1,4), pentylene-(1,5), 3-oxa-pentylene-(1,5), 3-aza-pentylene-(1,5), hexylene-(1,6), 3-aza-hexylene-(1,6), or 3-methyl-3-aza-pentylene-(1,6), and at least one of the radicals $R_5$ and $R_6$ is a lower alkyl radical, for example, one of those just mentioned, a hydroxyalkyl radical having two carbon atoms preceding the hydroxyl group, e.g., hydroxyethyl, or a cycloalkyl or aza-cycloalkyl radical, e.g., cyclopentyl or cyclohexyl, or an oxaalkyl radical, e.g., 3-oxabutyl or 3-oxapentyl, and the other such radical is a hydrogen atom, or $R_5$ and $R_6$ together represent one of the alkylene, aza- or oxa-alkylene radicals just mentioned. In the Formulae I to IV the tertiary amino groups are above all diethylamino groups.

The new compounds and their salts possess valuable pharmacological properties. Inter alia they inhibit the transmission of excitation in the central nervous system and can therefore be used as medicaments, for example as spinal blocking agents, for the treatment of neurological diseases, more especially such as are accompanied by increased spasticity. The new compounds and their salts are also suitable for use in veterinary medicine.

Especially valuable are compounds of the formula

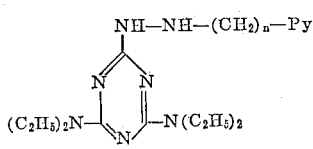

and their salts, in which formula $n=1$ or 2 and Py represents pyridyl, especially pyridyl-(4), and particularly the 2-[pyridyl-(4) - methyl - hydrazino] - 4,6 - bis-diethylamino-1,3,5-triazine and its salts, as well as the compounds of the formulae

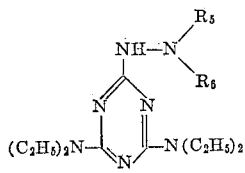

and

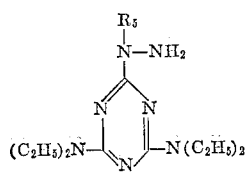

and their salts, in which formulae $R_5$ represents a lower alkyl radical, above all methyl, ethyl, propyl, isopropyl, butyl, isobutyl or secondary butyl, a lower oxyalkyl radical having 2-4 carbon atoms preceding the hydroxyl group, above all the β-hydroxyethyl radical, and $R_6$ represents hydrogen or has the same meaning as $R_5$, and primarily the 2-[1'-(β-hydroxy-ethyl)-hydrazino]-4:6-bis-diethylamino-1,3,5-triazine, the 2-(2',2'-dimethylhydrazino)-4,6-bis-diethylamino-1,3,5-triazine and the 2-(1'-methylhydrazino)-4,6 - bis - di-ethylamino-1,3,5-triazine, and their salts.

The new compounds are prepared by methods as such known; preferably a compound of the formula

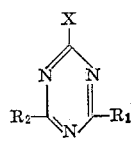

in which $R_1$ and $R_2$ have the above meanings and X represents an exchangeable radical, for example a halogen atom such as chlorine or bromine is reacted with a hydrazine of the formula $R_3H$ in which $R_3$ has the meaning defined above. The reaction is advantageously performed in the presence of a diluent, if desired also in the presence of a condensing agent, for example an excess of hydrazine, and if desired also in the presence of a catalyst, such as copper powder.

According to another variant of the present process there is introduced into the hydrazino group of a compound of the formula

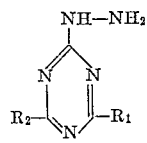

in which $R_1$ and $R_2$ have the above meanings, the radical of an unsubstituted or substituted lower hydrocarbon radical of aliphatic character whose carbon chain may be interrupted by hetero atoms. This introduction is preferably performed with an oxo compound which by reduction yields a suitable alcohol, for example with an aldehyde or ketone of aliphatic character, whereupon the Schiff's base formed or a similar condensation product is reduced. If desired, the oxo compound may also be used in the presence of the reducing agent. Suitable reducing agents are, for example, catalytically activated hydrogen, for example hydrogen in the presence of a catalyst of a noble metal of Group VIII of the Periodic Table, for example platinum oxide, or nascent hydrogen or an agent capable of yielding hydrogen, for example a complex metal hydride.

Depending on the conditions employed for the alkylation one or several aliphatic radicals may be thus introduced into the hydrazino group.

Finally the new compounds are also obtained when in a 2-$R_1$-4-$R_2$-6-Z-1,3,5-triazine (in which $R_1$ and $R_2$ have the above meanings and Z represents a group $R_3$ substituted by an acyl group in which $R_3$ has the above meaning) said acyl group is eliminated. In this connection an acyl group is, for example, the radical of an aliphatic or aromatic carboxylic acid, for example an alkanoyl or benzoyl radical, such as an acetyl, trifluoracetyl or benzoyl radical, or a sulfonic acid radical, such as the radical of a benzene-sulfonic or toluenesulfonic acid. The acyl radical is eliminated in the usual manner by hydrolysis, more especially by acid hydrolysis.

The above reactions are performed in the known manner, in the absence or preferably presence of a condensing agent and/or catalyst, at room temperature or at an elevated temperature.

Depending on the reaction conditions used the new compounds are obtained in the form of their free bases or of their salts. From the bases therapeutically useful salts can be prepared, for example, those of the hydrohalic, sulfuric, phosphoric acids, nitric or perchloric acid; aliphatic, alicyclic, aromatic or heterocyclic carboxylic or sulfonic acids such as formic acetic, propionic, oxalic, succinic, glycollic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicylic or para-aminosalicyclic acid; methanesulfonic, ethanesulfonic, hydroxyethanesulfonic, ethylenesulfonic acid; toluenesulfonic, or naphthalenesulfonic acids or sulfanilic acid; methionine, tryptophan, lysine or arginine.

The new compounds and their salts can be used as medicaments, for example in the form of pharmaceutical preparations containing said compounds or salts thereof in admixture with a pharmaceutical organic or inorganic, solid or liquid excipient suitable for enteral or parenteral administration. Suitable excipients are substances that do not react with the new compounds such as water, gelatine, lactose, starches, magnesium stearate, talc, vegetable oils, benzyl alcohols, gums, polyalkylene glycols, cholesterol or other known medicinal excipients. The pharmaceutical preparations may be, for example, tablets or dragées, or in liquid form solutions, suspensions or emulsions. They may be sterilized and/or may contain assistants such as preserving, stabilising, wetting or emulsifying agents, salts for regulating the osmotic pressure or buffers. They may also contain further therapeutically useful substances. The preparations are formulated by the conventional methods. They contain the active substance for example in a quantity of 5–100 mg. per dosage unit. The proportion of excipient may of course vary within wide limits. Advantageously, however, the new preparations contain 1–60% of active principle.

Any starting material required for performing the aforementioned reaction that is not known can be made by a conventional method.

The present invention also includes any variant of the present process in which an intermediate obtained at any stage of the process is used as starting material and any remaining step or steps is/are carried out; or the process is terminated at any stage thereof; or a starting material is formed in the course of a reaction or used in the form of one of its salts.

This is a continuation-in-part application of our co-pending application Serial No. 124,328, filed July 17, 1961, now abandoned.

The following examples illustrate the invention:

Example 1

A solution of 15.0 grams of 2-chloro-4:6-bis-diethylamino-1,3,5-triazine and 6.6 grams of methylhydrazine in 100 cc. of ethanol is heated for 4 hours at the boil. The mixture is completely evaporated, and the residue is dissolved in ether, washed with water and 3 times with dilute hydrochloric acid. The aqueous acid solution is alkalinized with dilute sodium hydroxide solution and repeatedly agitated with ether. The ether solution is dried and completely evaporated and the liquid residue is distilled in a high vacuum, to yield 2-(1'-methylhydrazino)-4,6-bis-diethylamino-1,3,5-triazine of the formula

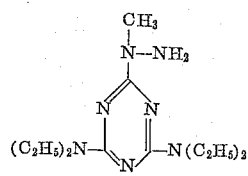

as a liquid boiling at 126–128° C. under 0.15 mm. Hg pressure.

Example 2

A solution of 15.0 grams of 2-chloro-4,6-bis-diethylamino-1,3,5-triazine and 8.6 grams of 1,1-dimethylhydrazine in 100 cc. of ethanol is heated for 4 hours at the boil. The mixture is completely evaporated and the residue is dissolved in ether, washed with water and 3 times with dilute hydrochloric acid. The aqueous acid solution is alkalinized and repeatedly agitated with ether. The ether solution is dried and completely evaporated and the liquid residue is distilled twice in a high vacuum, to yield 2-(2':2'-dimethylhydrazino)-4,6-bis-diethylamino-1,3,5-triazine of the formula

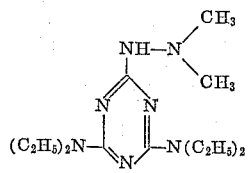

as a liquid boiling at 115–116° C. under 0.2 mm. Hg pressure.

Example 3

A solution of 10.0 grams of 2-chloro-4,6-bis-diethylamino-1,3,5-triazine and 7.3 grams of β-hydroxy-ethyl-hydrazine in 100 cc. of ethanol is heated for 6 hours at the boil. The mixture is completely evaporated and the residue is dissolved in ether, washed with water and 3 times with dilute hydrochloric acid. The aqueous acid solution is alkalinized with dilute sodium hydroxide solution and repeatedly agitated with ether. The ether solution is dried and completely evaporated and the residue is recrystallized 3 times from petroleum ether, to yield 2-[1'(β-hydroxyethyl)-hydrazino]-4,6-bis-diethylamino-1,3,5-triazine of the formula

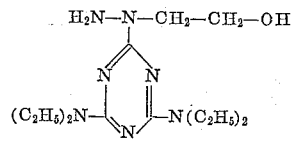

in white crystals melting at 63–65° C.

Example 4

12.0 g. of 2-hydrazino-4,6-bis-diethylamino-1,3,5-triazine in 100 cc. of absolute ethanol are treated with 3.4 g. of n-butyraldehyde, allowed to stand at room temperature for several hours, and then heated to the boil for 2 hours. The solution is concentrated, the oily residue dissolved in 100 cc. of glacial acetic acid, and hydrogenated under atmospheric pressure, at room temperature, in the presence of 0.3 g. of platinum oxide. The uptake of hydrogen takes an hour and a half. The solution is filtered and evaporated, the oily residue dissolved in dilute hydrochloric acid, agitated with ether, and the aqueous acid solution alkalinized with dilute sodium hydroxide solution, and extracted by agitating it with ether. The ethreal solution is dried and concentrated, and the residue distilled under a high vacuum. There is obtained in this manner 2-(2'-n-butyl-hydrazino)-4,6-bis-diethylamino-1,3,5-triazine of the formula

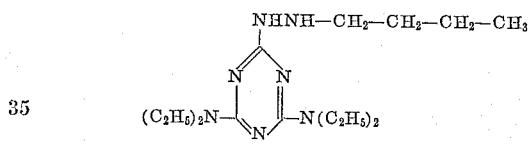

in the form of a thickly liquid oil which boils at 155–160° C. under a pressure of 0.3 mm. of Hg.

Example 5

20 g. of 2-hydrazino-4,6-bis-diethylamino-1,3,5-triazine are treated with 100 cc. of acetone, allowed to stand at room temperature for several hours, then heated to the boil for an hour and a half. The solution is evaporated, the oily residue dissolved in 150 cc. of glacial acetic acid, and hydrogenated under atmospheric pressure at room temperature in the presence of 0.5 g. of platinum oxide. The hydrogenation takes about 5 hours and a half. The solution is filtered and concentrated, and the oily residue treated with ethanolic hydrochloric acid. On addition of absolute ether, the 2-(2'-isopropyl-hydrazino)-4,6-bis-diethylamino-1,3,5-triazine-dihydrochloride of the formula

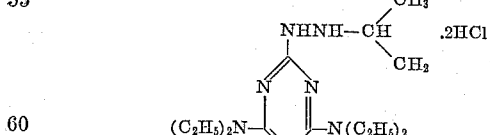

crystallizes. The white crystals melt at 190–193° C.

Example 6

12.0 g. of 2-hydrazino-4,6-bis-diethylamino-1,3,5-triazine in 100 cc. of absolute ethanol are treated with 4.0 g. of cyclopentanone, allowed to stand at room temperature for several hours, and then heated to the boil for 2 hours. The solution is completely evaporated, the oily residue dissolved in 100 cc. of glacial acetic acid, and hydrogenated under atmospheric pressure at room temperature in the presence of 0.5 g. of platinum oxide. The hydrogenation takes about 11 hours. The solution is filtered and concentrated, and the oily residue distilled under a high vacuum.

There is obtained in this manner 2-(2'cyclopentylhydrazino)-4,6-bis-diethylamino-1,3,5-triazine of the formula

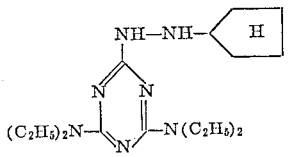

as a thickly liquid oil boiling at 165–167° C. under a pressure of 0.35 mm. Hg.

*Example 7*

30.0 g. of 2-hydrazino-4,6-bis-diethylamino-1,3,5-triazine in 200 cc. of absolute ethanol are treated with 11.6 g. of cyclohexanone. The mixture is allowed to stand at room temperature for several hours, then heated to the boil for 2 hours, after which the solvent is evaporated completely. 25 g. of the oily residue (crude cyclohexylhydrazone) are dissolved in 150 cc. of glacial acetic acid and hydrogenated at room temperature under atmospheric pressure in the presence of 0.5 g. of platinum oxide. The hydrogenation takes about 2 hours. The solution is filtered and evaporated completely, the residue dissolved in chloroform, and the solution washed with dilute sodium hydroxide solution. The chloroformic solution is dried and concentrated, and the thickly liquid residue treated with ethanolic hydrochloric acid. On addition of absolute ether the 2-(2'-cyclohexylhydrazino)-4,6-bis-diethylamino-1,3,5-triazine-dihydrochloride of the formula

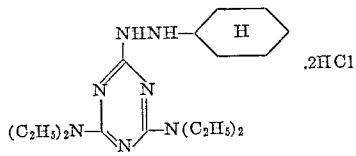

crystallizes; the white crystals melt at 183–185° C.

*Example 8*

30 g. of 2-hydrazino-4,6-bis-diethylamino-1,3,5-triazine in 100 cc. of absolute alcohol are treated with 13.4 g. of N-methyl-4-piperidone. The mixture is allowed to stand at room temperature for several hours, then heated to the boil for 2 hours. The solution is evaporated completely. Of the oily residue (hydrazone) 10.7 g. are dissolved in 100 cc. of glacial acetic acid and hydrogenated under atmospheric pressure at room temperature in the presence of 0.5 g. of platinum oxide. The hydrogenation takes an hour and a half. The solution is filtered and concentrated, the residue dissolved in chloroform, and the solution washed with dilute sodium hydroxide solution until it has an alkaline reaction. The chloroformic solution is dried and evaporated completely, and the residue distilled under a high vacuum. There is obtained in this manner 2-[2'-N' - methylpiperidyl - (4) - hydrazino] - 4,6 - bis - diethylamino - 1,3,5 - triazine of the formula

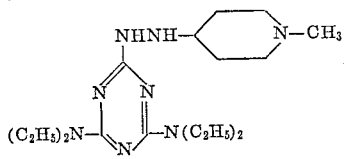

in the form of a viscous liquid which boils at 190–192° C. under a pressure of 0.3 mm. of Hg.

*Example 9*

12.0 g. of 2-hydrazino-4,6-bis-diethylamino-1,3,5-triazine are dissolved in 100 cc. of ethanol and treated with 3.42 g. of methylethylketone. The mixture is allowed to stand at room temperature for several hours, then heated to the boil for 2 hours, and concentrated. The residual viscous hydrazone is dissolved in 100 cc. of glacial acetic acid, and hydrogenated under atmospheric pressure at room temperature in the presence of 0.3 g. of platinum oxide. The hydrogenation requires 9 hours. The solution is filtered and evaporated completely. The residue is treated with water, acidified with 2 N-hydrochloric acid, and agitatd with ether. The acid aqueous solution is rendered strongly alkaline and then extracted with ether again. The ethereal solution is dried and concentrated, and the residue distilled under a high vacuum. There is obtained in this manner the 2-(2'-secondary butylhydrazino) - 4,6 - bis-diethylamino-1,3,5-triazine of the formula

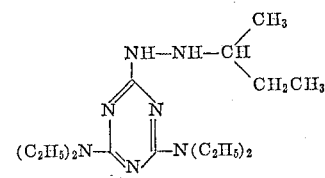

in the form of a viscous oil which boils at 158–160° C. under a pressure of 0.3 mm. of Hg.

*Example 10*

12.0 grams of 2-hydrazino-4,6-bis-diethylamino-1,3,5-triazine in 100 cc. of absolute ethanol are treated with 5.1 grams of 4-pyridine aldehyde; the mixture is kept at room temperature for several hours and then heated at the boil for 2 hours. The solution is completely evaporated and the crystalline residue is dissolved in 100 cc. of glacial acetic acid and hydrogenated under atmospheric pressure at room temperature in the presence of 0.5 gram of platinum oxide. The absorption of hydrogen takes 4.5 hours. The filtered solution is concentrated and the dark, oily residue dissolved in 2 N-hydrochloric acid, filtered through active carbon, alkalinized with 2 N-sodium hydroxide solution and extracted by agitation with ether. The ether solution is dried, completely evaporated and the oily residue is dissolved in ethyl acetate, acidified with ethanolic hydrochloric acid and cooled. The crystallizate is suction-filtered and recrystallized from a mixture of ethyl acetate, absolute alcohol and ether, to yield 2-[2'-pyridyl-(4")-methylhydrazino]-4,6-bis-diethylamino-1,3,5-triazine dihydrochloride of the formula

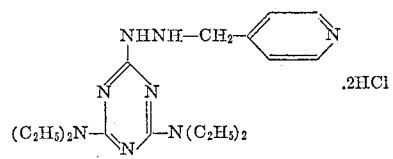

in white crystals melting at 231 to 235° C.

*Example 11*

20 g. of 2-chloro-4-diethylamino-6-pyrrolidino-1,3,5-triazine and 9.0 g. of methylhydrazine are dissolved in 150 cc. of alcohol and boiled for four and a half hours. The product is worked up as described in Example 1. The liquid residue is distilled under a high vacuum. There is thus obtained the 2-(1'-methylhydrazine)-4-diethylamino-6-pyrrolidino-1,3,5-triazine of the formula

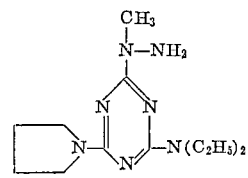

as a liquid boiling at 119–121° C. under a pressure of 0.07 mm. of Hg.

The 2 - chloro - 4-diethylamino-6-pyrrolidino-1,3,5-triazine used as starting material can be obtained as follows:

42 g. of 2,4-dichloro-6-diethylamino-1,3,5-triazine (J. T. Thurston et al., J. Am. Chem. Soc. 73, 2981, 1957) are dissolved in 250 cc. of benzene, and treated at room temperature with a solution of 27 g. of pyrrolidine in 100 cc. of benzene. The internal temperature rises slightly, and the pyrrolidine hydrochloride precipitates in the form of an oily substance. The mixture is left to itself at room temperature for one hour and then filtered through active carbon, the filtrate concentrated, and the residue extracted with hot petroleum ether. The extract is filtered through active carbon, the solvent is evaporated, and the slightly yellowish residue crystallized from methanol. It is the 2-chloro-4-diethylamino-6-pyrrolidino-1,3,5-triazine. Its white prisms melt at 90–91° C.

*Example 12*

15 g. of 2-hydrazino-4-diethylamino-6-pyrrolidino-1,3,5-triazine in 100 cc. of absolute alcohol are treated with 5.9 g. of cyclohexanone, the mixture kept at room temperature for several hours and then boiled for 2 hours. The solution is evaporated completely, the oily residue dissolved in 120 cc. of glacial acetic acid and hydrogenated under atmospheric pressure, at room temperature, and in the presence of 0.4 g. of platinum oxide. The uptake of hydrogen takes about 1 hour and 20 minutes. The solution is filtered and concentrated, and the residue dissolved in chloroform. The chloroformic solution is washed with dilute sodium hydroxide solution and with water, dried, filtered, and evaporated. The residue is dissolved in warm ethyl acetate and treated with an alcoholic solution of hydrochloric acid, and with absolute ether, then cooled, and the resulting hydrochloride filtered with suction. This salt is then dissolved in water, the solution akalinized with dilute sodium hydroxide solution and extracted several times by agitating it with ether. The ethereal solution is dried and evaporated, and the residue recrystallized from petroleum ether. There is thus obtained the 2-(2'-cyclohexylhydrazino)-4-diethylamino-6-pyrrolidino-1,3,5-triazine of the formula

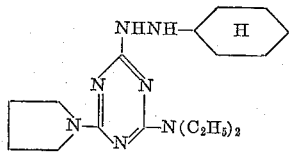

in the form of white crystals melting at 113–114° C.

*Example 13*

15 g. of 2-hydrazino-4-diethylamino-6-pyrrolidino-1,3,5-triazine in 100 cc. of absolute alcohol are treated with 6.4 g. of 4-pyridine aldehyde, kept at room temperature for several hours and then heated to the boil for 2 hours. The solution is evaporated completely, and the crystalline residue dissolved in 120 cc. of glacial acetic acid, and the solution hydrogenated under atmospheric pressure, at room temperature, and in the presence of 0.4 g. of platinum oxide. The absorption of hydrogen takes about 5 hours. The solution is filtered and evaporated completely, the residue dissolved in dilute hydrochloric acid, and the solution filtered. The acid aqueous solution is alkalinized and extracted several times with ether. The ethereal solution is dried and evaporated completely, the oily residue dissolved in warm ethyl acetate and the solution treated with an alcoholic solution of hydrochloric acid and with absolute ether. From the cooled solution the dihydrochloride crystallizes. It is recrystallized from absolute alcohol+absolute ether to obtain the 2-[2'-(pyridyl-(4''))-methyl)-hydrazino]-4-diethylamino-6-pyrrolidino-1,3,5-triazine-dihydrochloride of the formula

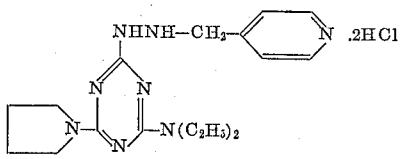

in the form of white crystals melting at 237–240° C.

*Example 14*

Tablets containing 10 mg. of 2-[2'-(pyridyl-(4'')-methyl)-hydrazino]-4,6-bis-diethylamino-1,3,5-triazine-dihydrochloride can be made, for example, with the following compositions:

| | Mg. |
|---|---|
| 2-[2'-(pyridyl-(4'')-methyl)-hydrazino]-4,6-bis-diethylamino-1,3,5-triazine-dihydrochloride | 10 |
| Lactose | 60 |
| Starch | 61 |
| Stearic acid | 2.8 |
| Talcum | 6.2 |
| | 140.0 |

The active substance is homogeneously mixed with the lactose, and part of the starch added. Another part of the starch is heated with water on a water bath, then added to the powder mixture, and the whole granulated and dried. The remainder of the starch and the lubricants are mixed with the dry granulate. Tablets weighing 140 mg. are compressed in the usual manner.

What is claimed is:

1. A member selected from the group consisting of a hydrazine of the formula

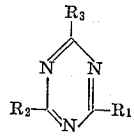

in which formula $R_1$ and $R_2$ each represents an amino group which is disubstituted by members selected from the group consisting of alkyl, alkenyl, monooxaalkyl, monoazaalkyl, cycloalkyl, cycloalkenyl, cycloalkyl-alkyl, cycloalkenyl-alkyl, mono-azacycloalkyl, mono-azacycloalkyl-alkyl, monooxacycloalkyl, monooxacycloalkyl-alkyl, alkylene, monooxaalkylene, monoazaalkylene and N-alkyl-mono-azaalkylene containing at most 8 carbon atoms each and $R_3$ represents hydrazino bearing at least one substituent selected from the group consisting of hydroxy-lower alkyl, cyclo-lower alkyl, monoazacyclo-lower alkyl, N-lower alkyl-monoazacyclolower alkyl, pyridyl-lower alkyl, furyl-lower alkyl, thienyl-lower alkyl and alkyl-pyridyl-lower alkyl, and a therapeutically useful acid addition salt thereof.

2. A compound of the formula

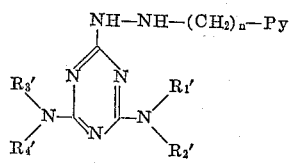

in which $n$ is an integer smaller than 3, Py represents pyridyl and

and

represent lower dialkylamino.

3. A compound of the formula

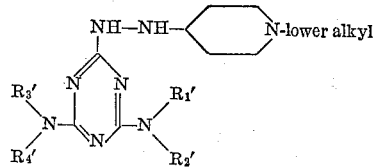

in which

and

stand for lower dialkylamino.

4. A compound of the formula

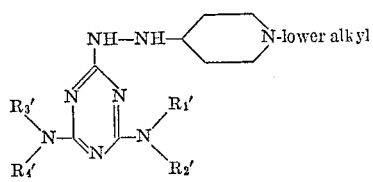

in which

stands for lower dialkylamino and

for lower alkyleneamino.

5. A compound of the formula

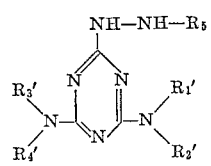

in which formula $R_1'$ to $R_4'$ represent lower alkyl and $R_5$ represents lower cycloalkyl.

6. A compound of the formula

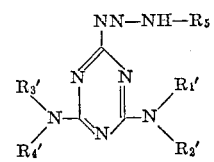

in which formula

represents lower alkyleneamino and

represents lower dialkylamino and $R_5$ stands for lower cycloalkyl.

7. A compound of the formula

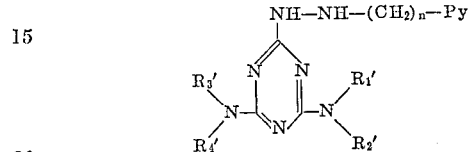

in which $n$ is an integer smaller than 3, Py represents pyridyl, $$-N\begin{matrix}R_1'\\ R_2'\end{matrix}$$

represents lower alkyleneamino and $$-N\begin{matrix}R_3'\\ R_4'\end{matrix}$$

lower dialkylamino.

8. The 2-[2'-(N-methyl-piperidyl-(4'')-hydrazino]-4,6-bis-diethylamino-1,3,5-triazine.

9. The 2-(2'-cyclohexyl-hydrazino) - 4 - diethylamino-6-pyrrolidino-1,3,5-triazine.

10. A therapeutically useful salt of the compound of claim 4.

References Cited by the Examiner

UNITED STATES PATENTS

| | | | |
|---|---|---|---|
| 2,295,565 | 9/42 | D'Alelio et al. | 260—249.6 |
| 2,824,103 | 2/58 | Heuni et al. | 260—249.6 |
| 3,017,380 | 1/62 | D'Alelio | 260—249.6 |

OTHER REFERENCES

D'Alelio: "Journal of Organic Chemistry," vol. 25, pp. 202–205 (1960).

IRVING MARCUS, Primary Examiner.

NICHOLAS S. RIZZO, WALTER A. MODANCE, Examiners.

UNITED STATES PATENT OFFICE
CERTIFICATE OF CORRECTION

Patent No. 3,178,431                             April 13, 1965

Alexander Staehelin et al.

It is hereby certified that error appears in the above numbered patent requiring correction and that the said Letters Patent should read as corrected below.

Column 11, lines 45 to 50, for that portion of the formula reading $$\underset{|}{N}N\text{-}NH\text{-}R_5 \quad\quad \text{read} \quad\quad \underset{|}{N}H\text{-}NH\text{-}R_5$$

column 12, line 38, for the claim reference numeral "4" read -- 9 --.

Signed and sealed this 11th day of January 1966.

(SEAL)
Attest:

ERNEST W. SWIDER                           EDWARD J. BRENNER
Attesting Officer                                Commissioner of Patents